May 22, 1956     E. L. WALTERS     2,746,209

EQUIPMENT FOR BENDING GLASS SHEETS

Filed Aug. 20, 1949     2 Sheets-Sheet 1

Inventor
Emmett L. Walters
By Nobbe & Swope
Attorneys

May 22, 1956  E. L. WALTERS  2,746,209
EQUIPMENT FOR BENDING GLASS SHEETS
Filed Aug. 20, 1949  2 Sheets-Sheet 2

Inventor
Emmett L. Walters
By
Nobbe & Swope
Attorneys

United States Patent Office 2,746,209
Patented May 22, 1956

2,746,209

EQUIPMENT FOR BENDING GLASS SHEETS

Emmett L. Walters, Toledo, Ohio, assignor to Libbey-Owens-Ford Glass Company, Toledo, Ohio, a corporation of Ohio Application August 20, 1949, Serial No. 111,358

7 Claims. (Cl. 49—67)

This invention relates to improved outline or skeleton type glass bending molds and equipment for handling the molds, and in particular to such equipment constructed in a manner and of such material that, in the desired forms, the structures will accurately retain their shapes without objectionable warping or growing during the repeated heating and cooling cycles to which glass bending equipment is subjected and will maintain a desirable temperature differential between the mold and the glass during use.

In order to meet, on a commercial scale, the demand for curved glass windows having close dimensional tolerances to eliminate the need for selective fitting in assembly, it is necessary to provide glass bending molds which are not only easy to machine to the desired shapes, but which also accurately retain such shapes during long periods of use.

It is a well known fact that most steel structures tend to warp and in many instances actually expand or grow as the stresses within the material are relieved by repeated heating and cooling cycles. Thus, in the production of precision machinery, it is customary to "normalize" the parts, particularly the castings, by repeated heating and cooling cycles so that after finish machining the parts will not undergo further dimensional changes. This process is not sufficient for glass bending molds because the heating and cooling cycles to which the molds are subjected cause warping of the molds as the stresses introduced into the material by machining or bending the parts to the desired shapes is relieved.

Another problem involved in the design and construction of glass bending molds is that the glass supporting surface must have heat capacity and heat transfer characteristics such that the glass being bent will not fuse or adhere to the mold surfaces.

Heretofore, most of the skeleton or outline type of glass bending molds in commercial use were formed by welding together flat pieces of metal of the desired contour, while the mold carrying frames were made in a similar manner of either flat metal or tubular pieces, and the actual bending surface of the mold was usually notched, serrated or otherwise made to give interrupted or non-continuous contact with the glass surface.

It is the primary aim of the present invention to provide improved molds, and equipment for handling these molds that are easier and cheaper to produce, that can be cold worked, that is, straightened or readily machined, and which will still exhibit no objectionable distortion, warping or dimensional change under high temperature and repetitive heating and cooling cycles such as are encountered during bending and/or tempering of glass sheets.

Briefly stated, this is accomplished according to the invention by the provision of a cast metal mold and/or mold handling equipment preferably of a nickel-chromium-iron alloy having high percentages of nickel.

Another object is to provide molds or mold sections of the above character that are formed with continuously extending shaping surfaces having relatively narrow portions contacting the marginal area of the bent glass and having substantially heavier section in heat conducting relation therewith.

Another object is the provision of such a mold having a substantially continuous glass engaging or shaping surface and cut-out or open portions in the body of the mold adjacent said shaping surface.

Another object is to provide a cast mold of a material that heats more slowly and cools more slowly than the glass so that there is always a temperature lag between the mold and the glass.

Still another object is the provision of a cast mold of this character which, because it heats more slowly than the glass, can be returned to the furnace after the bent glass sheet has been removed without complete reheating.

More specific objects and advantages will be apparent from the following description of improved molds constructed according to the invention.

According to the invention glass bending apparatus comprising cast molds and conveyor guides on a roller type conveyor are constructed of alloy castings, the castings preferably comprising from approximately one-third to two-thirds nickel; from approximately one-seventh to one-fifth chromium; and the balance substantially all iron, except for traces of such materials as manganese, silicon, nitrogen and carbon. The cast molds are further designed to have continuously extending upwardly directed rims constituting mold shaping surfaces. The upwardly directed rims are further designed to have a narrow surface in contact with the glass and to have substantially heavier sections in heat conducting and heat absorbing relation to the glass supporting surface.

Glass bending molds embodying the invention are illustrated in the accompanying drawings.

Figure 1:
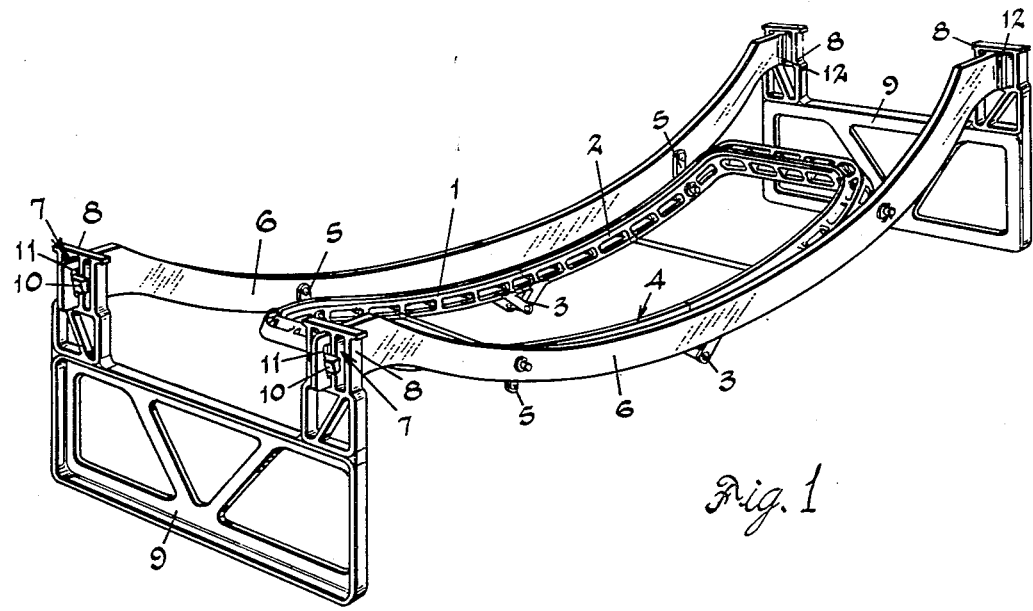
Fig. 1 is a perspective view of one form of cast mold and cast mold supporting framework of the invention.

These specific figures and the accompanying description are intended merely to illustrate the invention but not to impose limitations upon its scope.

Referring to the accompanying drawings, one preferred form of the improved structure comprises a mold that is formed of a pair of castings 1 and 2, each of which is generally U-shaped in plan and which at the ends of the legs of the U-shapes are provided with hinges 3 disposed a substantial distance below a shaping surface 4 formed on the mold and shaped to conform, in the position indicated, with the marginal area of a bent glass sheet.

The mold is suspended by means of a plurality of links 5 (see also Fig. 3) from side members 6 of a mold supporting frame. The ends of the side members 6 are fitted selectively into selected ones of a plurality of spaced openings 7 formed in upstanding ends 8 of end frames 9.

The end frames 9 as well as the side members 6 are castings, the end frames 9 being of openwork design to provide strength and stiffness without unnecessary weight.

Figure 2:
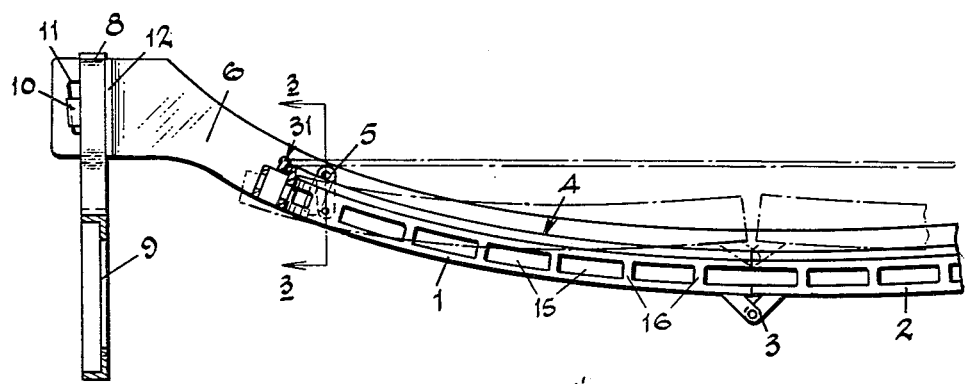
Fig. 2 is a vertical longitudinal section of the cast mold and framework shown in Fig. 1.
Figure 7:
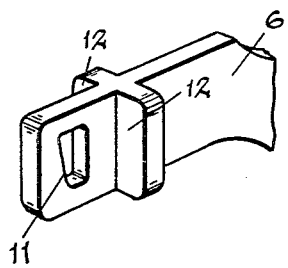
Fig. 7 is a detail view of one end of one of the side members of the frame carrying the improved mold.

A plurality of the openings 7 are provided in each of the end frames 9 so that the spacing between the side members 6 of the frame may be easily varied to accommodate molds of different widths. The side rails 6 are locked to the end frames 9 by means of wedge-shaped keys 10 that are engaged in tapered slots 11 in the ends of the side members 6. The wedge-shaped keys 10 may be slightly grooved as indicated in Fig. 2 to minimize any tendency for the keys to work out of position in the tapered slots 11 during repeated heating and cooling cycles and handling of the frames. When the wedge-shaped keys 10 are driven into place, shoulders 12 (see Fig. 7) are drawn tightly against the vertical surfaces of the frames 9 to make a rigid assembly.

The mold sections 1 and 2 are formed of spaced, platelike castings of openwork design (Fig. 1) to provide a maximum of strength and stiffness with a minimum of material. Thus, a cross section of the mold (Fig. 3) shows the mold to be composed of two spaced plates 13 and 14, provided with openings 15, and interconnected at intervals by cross webs 16 that serve to hold the plates in spaced relation; and that the inner one, 14, of the two plates is extended upwardly and tapered or angled to provide at its top a narrow continuous shaping surface—the surface 4—that conforms to the marginal area of a bent glass sheet. In a somewhat modified form (shown in Fig. 4) the narrower shaping surface 4' is produced by cutting out, instead of tapering the upper portion of the plates 14' at 17.

Figure 5:
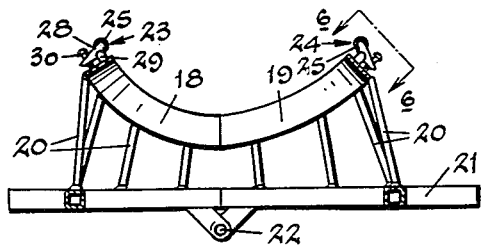
Fig. 5 is a side view of another form of cast mold constructed according to the invention.

Referring now to Fig. 5, another form of cast metal, glass bending mold is illustrated. In this example, a pair of mold halves 18, 19 are supported on a plurality of posts 20 from a base 21. The base 21, which may be constructed of tubular sections or castings, is divided into two parts that are interconnected by a hinge 22. The mold halves 18 and 19 are divided along the same vertical line so that movement of one portion with respect to the other on the hinge 22 separates the mold sections.

Suitable glass sheet locating devices 23 and 24 are mounted adjacent the shaping surface of the mold sections 18 and 19 in the portions remote from the hinge. Each of these locating devices comprises a ceramic roller 25 that is mounted on a pin 26 extending between arms 27 of a U-shaped lever assembly 28. The U-shaped assembly 28 is in turn pivotally mounted on a bracket 29 attached to the adjacent mold section 18 or 19 with the rollers 25 positioned adjacent but outside the outline formed by the shaping surface of the mold. An adjusting screw 30 is provided for varying the spacing between the roller and the adjacent shaping surface.

When a flat sheet of glass is to be placed in bending relation to the mold of Fig. 5, the mold sections are separated by rotation on the hinge 22 until the glass sheet may be inserted between the rollers 25 of the locating devices 23 and 24. The mold itself is supported on the ends of the base 21 remote from the hinge 22 so that the glass sheet to be bent serves as a strut holding the mold in its open position. As the mold and the glass is passed through the furnace, the glass softens and sags thus permitting the mold to return to the position shown in Fig. 5 as the glass settles against the shaping surface.

Figures 3, 4:
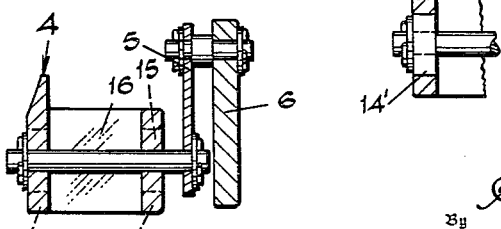
Fig. 3 is a fragmentary vertical section taken along the line 3—3 of Fig. 2 to show the detail of construction of one of the links that supports the mold from the framework.
Fig. 4 is a fragmentary view similar to Fig. 3, but showing a slightly modified mold construction.
Figure 6:
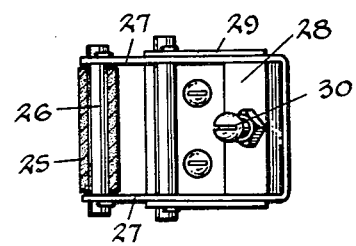
Fig. 6 is a view partly in section of one of the locating devices as seen from the line 6—6 of Fig. 5.

The mold, shown in Figs. 1, 2 and 3, operates similarly in that locators 31 similar to locators 23 and 24 of Figs. 5 and 6, one of which is shown generally in Fig. 2, are mounted at the ends of the mold sections 1 and 2. When a flat glass sheet is placed on this mold, preparatory to bending, the mold halves are raised at the hinge joint to separate the ends sufficiently to allow the glass to be placed between the locators 31. The supporting links 5 permit the accompanying endwise motion. Then, as the glass softens during the bending operation, it tends to sag and finally comes into contact with the shaping surface 4 as the mold returns to its closed form as shown in Fig. 1 and in solid lines in Fig. 2.

Figure 8:
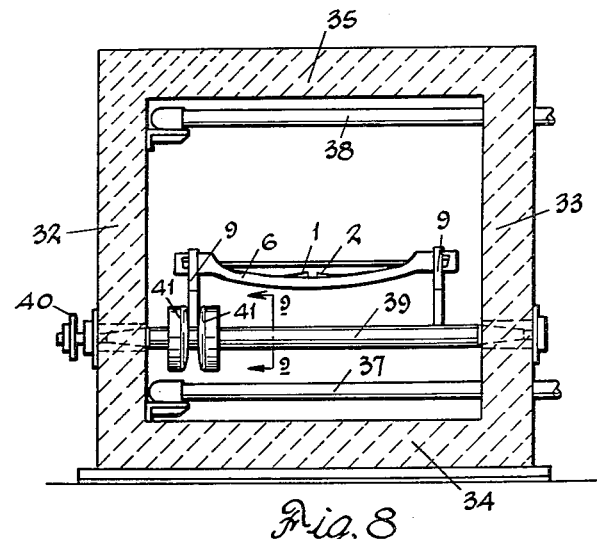
Fig. 8 is a simplified vertical transverse section of a furnace having a conveyor constructed according to the invention for carrying molds and their supporting frames through the furnace.
Figure 9:
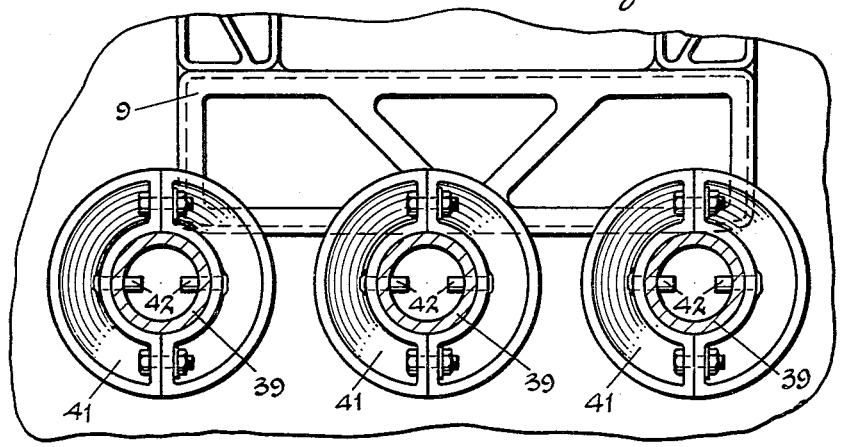
Fig. 9 is a fragmentary vertical section of a portion of the conveyor showing the relationship between the conveyor rollers and the frame carrying a mold.

Figs. 8 and 9 illustrate portions of a conveyor system for transporting the molds and mold frames through a furnace. As illustrated in Fig. 8, the furnace comprises insulated side walls 32 and 33, a floor 34 and a ceiling 36. Burner tubes 37 and 38 are arranged within the furnace to supply the heat required for bending the glass.

The mold frames including the mold sections 1 and 2 are carried on a roller conveyor comprising a large number of parallelly positioned driven rollers 39 which together form a conveyor extending throughout the length of the furnace. Each of the rollers 39 is provided on its end outside the furnace with a drive sprocket 40 so that drive chains may be employed to rotate the rollers at uniform speed.

Each of the rollers 39 is provided with a pair of collars 41 which are formed in half sections for easy application to the rollers and which are positively located axially of the rollers 39 by means of pins 42 welded into the hubs of the collars and fitted into holes in the rollers 62. The adjacent faces of the collars 41 are tapered and spaced apart to provide, in cooperation with similar collars on adjacent conveyor rollers 39, a V-shaped trough for guiding the end frames 9 and preventing the mold from straying sidewise into contact with a side wall of the furnace.

It was mentioned earlier that narrow dimensional tolerances are required in the bending of the glass sheets because the curved glass windows have to fit the receiving window frames accurately without selective assembly. This requirement makes it necessary that the molds accurately retain their shape during continued usage in which they are alternately heated to bending temperatures and then cooled nearly to room temperature. It is also necessary that the molds be machinable so that they can be constructed to the exact degree of curvature required. These requirements are met by constructing the molds, the mold supporting frames, and the conveyor roller collars from alloy castings, the castings preferably being composed of nickel, chromium, and iron including controlled amounts of carbon and traces of other metals.

A preferred composition of alloy, and one used by the assignee company in cast metal bending molds that are now in actual commercial production, is one containing approximately 35 per cent nickel, approximately 15 per cent chromium, from 0.2% to 0.5% controlled carbon and the balance all iron except for traces of silicon, manganese, nitrogen (less than one per cent of each) and impurities often present in iron. This alloy, while it has a very high melting temperature, is machinable so that the molds may be finished to the desired shape. It has a high density and relatively high specific heat as well as good heat conductivity so that it, particularly in thicker sections, heats uniformly but slowly when subjected to the heated furnace atmosphere. The alloy further retains its strength at the glass bending temperatures without tending to warp or grow objectionably as do most metals when heated and cooled through wide temperature ranges.

Some variation in the nickel and chromium content of the preferred alloy can be made, and very satisfactory results have been obtained with molds cast from this type of alloy containing from 34 to 40 per cent nickel and from 14 to 21 per cent chromium. In fact, while the effective range of the chromium content of the alloy lies within relatively close limits, the effective range of nickel content is quite wide. Thus, excellent results may also be obtained with from approximately 34 to 68 per cent nickel with from 14 to 21 per cent chromium, although this alloy with the higher percentages of nickel is considerably more expensive.

It was pointed out previously and shown in the drawings that those portions of the cast mold sections adjacent the shaping surfaces of the molds (Figs. 3 and 4) were of relatively heavy cross section compared to other portions of the mold and the area of the shaping surface in contact with the glass. This particular construction offers the advantages that the rate of temperature rise of the shaping surface lags appreciably behind the rate of temperature rise of the glass during a bending operation so that the glass does not have a tendency to fuse to the shaping surface. While the specific heat of the glass and the alloy are of the same order of magnitude, the density of the alloy is approximately three times that of the glass. Furthermore, the mold, particularly adjacent the shaping surface, is of heavier cross section so as to have less exposed area per unit of volume thus augmenting the tendency of the metal temperature to lag behind that of the glass during the bending operation. This temperature lag of the shaping surface is of particular importance in minimizing any tendency of the glass to fuse to the mold and in keeping the marginal areas of the glass slightly cooler than the rest of the sheet. This lowering of marginal area temperatures reduces the tendency of the glass to yield to minor irregularities of the shaping surface. This tends to reduce the optical distortion usually observed near the marginal areas of bent glass sheets.

Molds cast of an alloy according to the invention have been found to maintain their shape within close tolerances during much longer useful lives than molds constructed by welding together rolled sections which have been bent to shape. Such welded molds must be inspected periodically and reshaped in order to maintain the bent glass sheets within permissible dimensional tolerances.

Various modifications in details of construction and in proportions of the alloy constituents may be made without departing from the spirit and scope of the invention.

Having described the invention, I claim:

1. A mold for use in bending glass, said mold in plan being of a substantially closed outline shape conforming to the marginal outline of a sheet to be bent and including a casting comprising a narrow upstanding rim having a continuous shaping surface thereon for receiving the sheet to be bent and a series of openings in the body of said casting adjacent said shaping surface, said casting being cast from an alloy comprising approximately 35% nickel, 15% chromium, less than 0.5% carbon, traces of silicon, manganese and nitrogen, and the balance substantially all iron, and means for supporting a glass sheet in bending relation to said shaping surface.

2. A mold suitable for repeated use in the bending of glass sheets, said mold comprising a nickel-chromium-iron casting of open frame design conforming generally to at least a portion of the outline of a sheet of glass to be bent, said casting having an upstanding narrow rim the surface of which conforms to the marginal area of the bent glass sheet, said casting being formed with sections near the glass thicker and heavier than the glass contacting portions so that the temperature of the mold lags behind the temperature of the glass during heating and cooling, whereby on repetitive use the mold retains heat from the previous molding cycle thereby lowering the heat demand of the furnace.

3. A glass bending mold suitable for repeated use in the bending of glass sheets, said mold comprising a plurality of open frame castings hingedly connected together and collectively conforming to the outline of a sheet of glass to be bent, said castings being cast of an alloy of approximately one part chromium, two and a half parts nickel, and three parts iron and characterized by excellent dimensional stability during repeated heating and cooling, said castings each having an upstanding continuous rim conforming to the marginal area of a bent glass sheet, and having a heavy cross sectional area adjacent the rim such that the temperature of the rim changes more slowly than the temperature of the glass supported thereon during a bending operation.

4. A mold for use in bending glass sheets comprising an open skeleton framework having a substantially continuous shaping surface and a series of openings in said framework adjacent said shaping surface but below and spaced therefrom, and cast from an alloy comprising essentially 34 to 40 per cent nickel, 14 to 21 per cent chromium, 0.2 to 0.5 per cent carbon, and the balance iron.

5. A mold for use in the shaping of glass sheets comprising an open skeleton framework including an upstanding cast metal plate having a continuous upper edge which comprises at least a part of the shaping surface of the mold, and openings in the body of said plate adjacent said shaping surface but completely surrounded by said metal plate.

6. A mold for use in the shaping of glass sheets comprising an open skeleton framework including an upstanding continuous cast metal plate the upper edge of which comprises the shaping surface of the mold, said plate having a portion of the upper part thereof cut away to produce a shaping surface of relatively thin cross section and a portion of relatively thicker cross section spaced from said shaping surface.

7. A mold for use in the shaping of glass sheets comprising an open skeleton framework including an upstanding continuous cast metal plate the upper edge of which comprises the shaping surface of the mold, said plate being tapered in cross section from said shaping surface to a portion of relatively thicker cross section spaced from said shaping surface.

References Cited in the file of this patent

UNITED STATES PATENTS

| | | |
|---|---|---|
| 1,107,476 | Barot | Aug. 18, 1914 |
| 1,190,652 | Henderson | July 11, 1916 |
| 2,003,383 | Miller | June 4, 1935 |
| 2,330,349 | Galey | Sept. 28, 1943 |
| 2,452,488 | Paddock et al. | Oct. 26, 1948 |
| 2,551,607 | Jendrisak | May 8, 1951 |